(12) United States Patent
Chan et al.

(10) Patent No.: US 8,117,888 B2
(45) Date of Patent: Feb. 21, 2012

(54) METHOD AND APPARATUS OF IMPROVING ACCURACY OF ACCELEROMETER

(75) Inventors: Kai Kin Chan, Hong Kong (CN); Chor Tin Ma, Hong Kong (CN)

(73) Assignee: Perception Digital Limited, Hong Kong (CN)

( * ) Notice: Subject to any disclaimer, the term of this patent is extended or adjusted under 35 U.S.C. 154(b) by 438 days.

(21) Appl. No.: 12/549,720

(22) Filed: Aug. 28, 2009

(65) Prior Publication Data

US 2010/0199744 A1    Aug. 12, 2010

(30) Foreign Application Priority Data

Feb. 11, 2009   (HK) .............................. 09101302.2
Apr. 17, 2009   (CN) ......................... 2009 1 0106725

(51) Int. Cl.
*G01P 21/00*          (2006.01)

(52) U.S. Cl. ......................................... 73/1.38; 73/1.01

(58) Field of Classification Search ................... 73/1.38, 73/1.01
See application file for complete search history.

(56) References Cited

U.S. PATENT DOCUMENTS

| | | | |
|---|---|---|---|
| 6,347,541 B1 | 2/2002 | Maleki | |
| 6,810,738 B2 | 11/2004 | Sakaguchi | |
| 6,883,638 B1 * | 4/2005 | Maxwell et al. | 181/102 |
| 7,026,826 B2 | 4/2006 | Wilcoxon | |
| 7,610,166 B1 * | 10/2009 | Solinsky | 702/160 |
| 2008/0296442 A1 * | 12/2008 | Ruggiero et al. | 246/473.1 |
| 2010/0192662 A1 * | 8/2010 | Yanni | 73/1.38 |

* cited by examiner

*Primary Examiner* — Hezron E Williams
*Assistant Examiner* — Rodney T Frank
(74) *Attorney, Agent, or Firm* — William J. Sapone; Coleman Sudol Sapone P.C.

(57) ABSTRACT

A method and apparatus for calibrating or adjusting an accelerometer, wherein the accelerometer is held stationary to obtain the signal outputs from the accelerometer, representing component vectors making up the composite vector of 1 g. Thus, gain or sensitivity, and the zero-g signal offset along for each axis of the accelerometer is determined and adjustable.

22 Claims, 7 Drawing Sheets

METHOD AND APPARATUS OF IMPROVING ACCURACY OF ACCELEROMETER

FIELD OF THE TECHNOLOGY

The present invention relates to a method and apparatus for improving the accuracy of accelerometer. More specifically, the invention relates to calibrating the zero-g output and the sensitivity of a 3-axis accelerometer.

BACKGROUND

An accelerometer is a device that senses and measures force or acceleration applied on the accelerometer by monitoring component acceleration vectors, $a_x$, $a_y$, and $a_z$, in three orthogonal axes, x, y, and z defining three dimension space. The component vectors $a_x$, $a_y$, and $a_z$ are respectively indicated by three output signals, typically in voltages, $V_x$, $V_y$, and $V_z$. The signal outputs are given by piezoelectric components in the accelerometer, each monitoring one of the orthogonal axes. Any change in the amount of acceleration experienced by the accelerometer along any of the axes is reflected as a proportional change in the voltage output. The proportion is termed as the "sensitivity" of the accelerometer and is usually expressed in mV/g. Each accelerometer has to be calibrated to determine the sensitivity of each the piezoelectric component monitoring a different axis.

When there is no force acting on a piezoelectric component, such as when the axis monitored by the piezoelectric component is held horizontal to the ground, the piezoelectric component should output no voltage output ideally, indicating that no force is detected (i.e. acceleration equals zero). However, in practice, there is always an offset voltage output from any piezoelectric component. This offset voltage is termed the "zero-g output" and is usually expressed in millivolts, mV. The residual voltage contributes to a systemic error and must be determined and subtracted from the voltage output of the piezoelectric component before multiplying with the "sensitivity", in order for the accelerometer readings to be accurate.

Therefore, an accelerometer has to be calibrated to determine and correct these errors before use.

U.S. Pat. No. 6,810,738, Sakaguchi discloses a method of calibrating a 3-axis accelerometer by holding the accelerometer still at two precise orientations, such that the monitored axes are in specific angles convenient to apply trigonometric solutions to determine the values of zero-g signal output and the sensitivity for each axis.

There are several disadvantages with this method. Firstly, factory conditions are not the same as field conditions and thus, the factory calibration is at best a good estimate of the field conditions, and is subject to inaccuracy or deviation due to environmental factors such as temperature and humidity changes. Furthermore, this method does not address production variations within the accelerometer, as such whether the angles between the axes defined by the piezoelectric components are inaccurately set. Furthermore, as the sensitivity and zero-g output of an accelerometer could vary due to environmental variations and gradual component degradation, calibration of the accelerometer should be done from time to time but this is not possible using Sakaguchi's method which requires high precision factory equipment to determine the angular orientation to gravity.

Therefore, it is desirable to provide a method of calibrating or improving the accuracy of the accelerometer which can be used in the field by a user, and without the need of precision equipment.

BRIEF SUMMARY OF THE INVENTION

In a first aspect, the present invention proposes a method of calibrating the accuracy of a 3-axis accelerometer comprising the steps of holding the 3-axis accelerometer in an orientation and relatively still to the earth, obtaining 3-axis accelerometer outputs, $V_x$, $V_y$, $V_z$ for each respective axis x, y, z, equating outputs, $V_x$, $V_y$, $V_z$ to gravitational force of 1 g according to the equation, $$1 = G_x^2(V_x - V_{xo})^2 + G_y^2(V_y - V_{yo})^2 + G_z^2(V_z - V_{zo})^2;$$

where
 $G_x$=gain of the 3-axis accelerometer along the x axis;
 $G_y$=gain of the 3-axis accelerometer along the y axis;
 $G_z$=gain of the 3-axis accelerometer along the z axis;
 $V_{xo}$=zero-g output of the x axis;
 $V_{yo}$=zero-g output of the y axis;
 $V_{zo}$=zero-g output of the z axis;
solving the values of $G_x$, $G_y$, $G_z$, $V_{xo}$, $V_{yo}$ and $V_{zo}$, whereby subsequent 3-axis accelerometer output is treated by the values of $G_x$, $G_y$, $G_z$, $V_{xo}$, $V_{yo}$ and $V_{zo}$ to obtain the component force vectors, $a_x$, $a_y$, $a_z$, along the axes of x, y and z, according to the relationship, $a_x = G_x(V_x - V_{xo})$, $a_y = G_y(V_y - V_{yo})$ and $a_z = G_z(V_z - V_{zo})$.

In a second aspect, the present invention proposes an accuracy improvement unit for a 3-axis accelerometer comprising an x input for receiving a $V_x$ output from the 3-axis accelerometer representing the force acting on an x axis, a y input for receiving a $V_y$ output from the 3-axis accelerometer representing the force acting on a y axis, a z input for receiving a $V_z$ output from the 3-axis accelerometer representing the force acting on a z axis, the accuracy improvement unit being capable of treating outputs $V_x$, $V_y$, $V_z$ as indicative of component vectors of an acceleration force of 1 g according to the relationship:

$$1 = G_x^2(V_x - V_{xo})^2 + G_y^2(V_y - V_{yo})^2 + G_z^2(V_z - V_{zo})^2$$

$G_x$=sensitivity of the accelerometer along the x axis;
 $G_y$=sensitivity of the accelerometer along the y axis;
 $G_z$=sensitivity of the accelerometer along the z axis;
 $V_{xo}$=zero-g signal output the x axis;
 $V_{yo}$=zero-g signal output the y axis; and
 $V_{zo}$=zero-g signal output the z axis;
the processing unit is capable of determining $G_x$, $G_y$, $G$, $V_{xo}$, $V_{yo}$ and $V_{zo}$ from said relationship, wherein the accuracy improvement unit being further capable of applying $G_x$, $G_y$, $G_z$, $V_{xo}$, $V_{yo}$ and $V_{zo}$ to subsequent outputs $V_x$, $V_y$, $V_z$ from the accelerometer to provide component force vectors $a_x$, $a_y$, $a_z$, according to the relationships, $a_x = G_x(V_x - V_{xo})$, $a_y = G_y(V_y - V_{yo})$ and $a_z = G_z(V_z - V_{zo})$.

The invention therefore provides a possibility to calibrate an accelerometer without having to orientate the angular position of any of the axes monitored by the accelerometer to the direction of the pull of gravity. This leads to a possibility that the calibration may be done in non-factory or non-precision settings. Accordingly, the invention also provides the possibility of calibration done by the consumer in environmental settings where the accelerometer is to be used. Systemic drifts and inaccuracies due to age and environmental factors, such as temperature, humidity, are therefore addressed and correctable by performing calibration in the locality of use.

Preferably, the method of calibrating the accuracy of a 3-axis accelerometer is triggered by a timer in either the 3-axis accelerometer or the accuracy improvement unit. Also preferably, the method further comprises steps of detecting that the accelerometer is rotated into a new orientation and determining that the 3-axis accelerometer is held still. Similarly, the accuracy improvement unit is preferably capable of determining that the accelerometer is rotated into a new orientation before collecting any one of the second to sixth set of outputs $V_x$, $V_y$, $V_z$. Also, it is preferable that the accuracy improvement unit is capable of determining that the 3-axis accelerometer is held still before collecting outputs $V_x$, $V_y$, $V_z$. Advantageously, this means that the calibration may be conducted without the user noticing it, while rotations and stillness of the accelerometer are monitored in order to screen for acceptable accelerometer output useable for calibration.

Optionally, determining that the 3-axis accelerometer is held still comprises calculating the composite acceleration vector represented by $V_{xm}$, $V_{ym}$, $V_{zm}$, wherein the 3-axis accelerometer is deemed to be still if the composite acceleration vector is within a pre-determined threshold value. This provides a method for determining that the accelerometer is held sufficiently still without requiring precision or factory settings.

Alternatively, determining that the 3-axis accelerometer is held still comprises the steps of collecting a plurality of accelerometer outputs within a pre-determined period of time, calculating the mean and standard deviation between the plurality of accelerometer outputs, wherein, if the standard deviation between the plurality of accelerometer outputs is within a pre-determined threshold, the accelerometer outputs is determined to have been collected with the accelerometer being sufficiently still.

BRIEF DESCRIPTION OF THE DRAWINGS

An non-limiting embodiment of the present invention, by way of example only, will now be described with reference to the following drawings, in which like reference numerals refer to like parts, wherein.

DETAILED DESCRIPTION OF EMBODIMENTS

Figure 1:
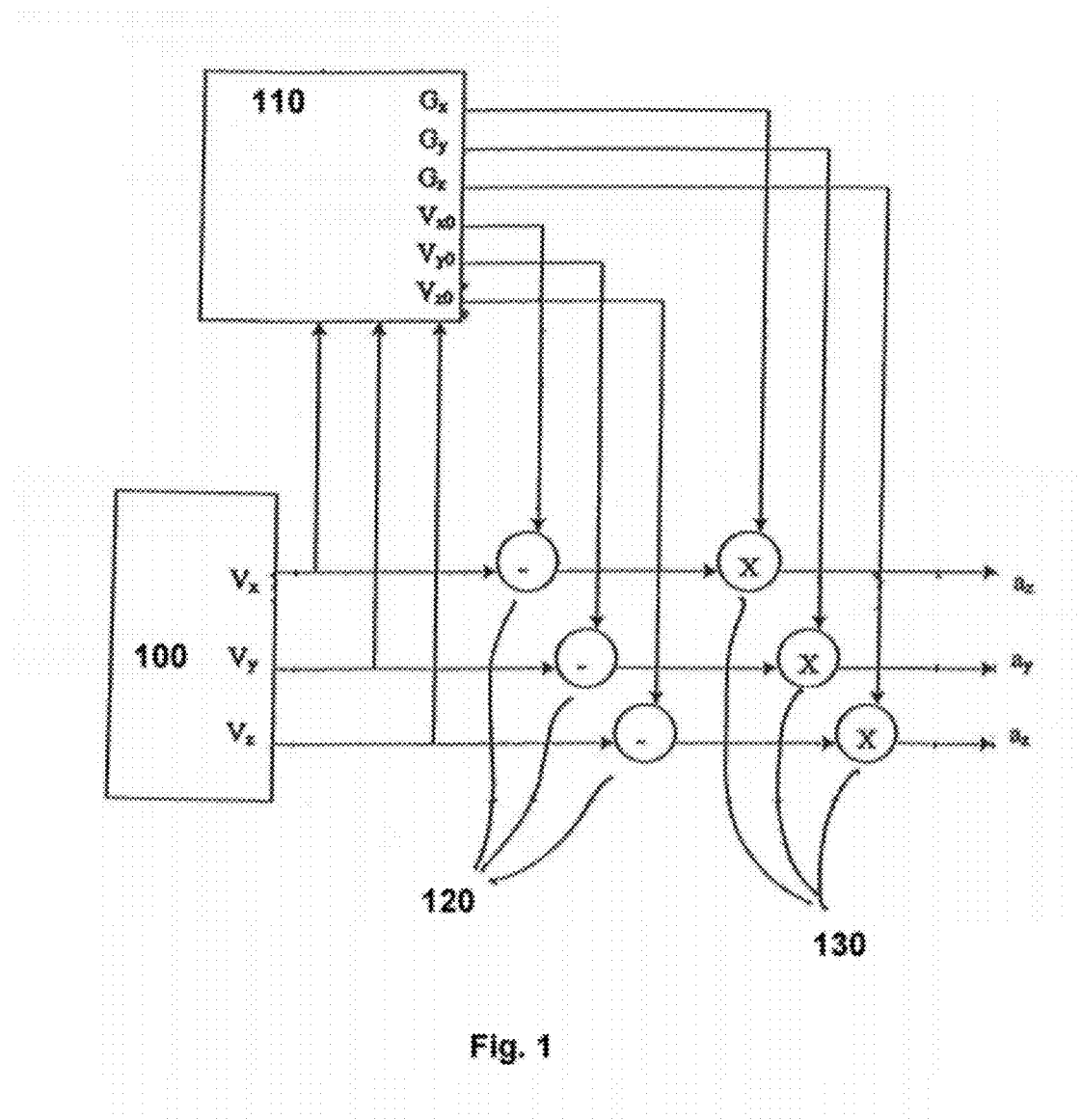
FIG. 1 is a schematic hardware block diagram of an embodiment of the invention.

FIG. 1 illustrates the block diagram of an embodiment of the invention, comprising an accuracy improvement unit 110 for improving the accuracy of a 3-axis accelerometer 100 or for calibrating the output of the 3-axis accelerometer 100.

Generally, the general physical setup of a 3-axis accelerometer 100 is well-known and it suffices to say that the skilled reader should be well aware of the use of piezoelectric components, not illustrated, in 3-axis accelerometers to monitor orthogonal axes defining three dimensional space and how piezoelectric components are able to indicate tensile or compressive stress due to external force or acceleration by outputting a voltage signal.

Figure 2:
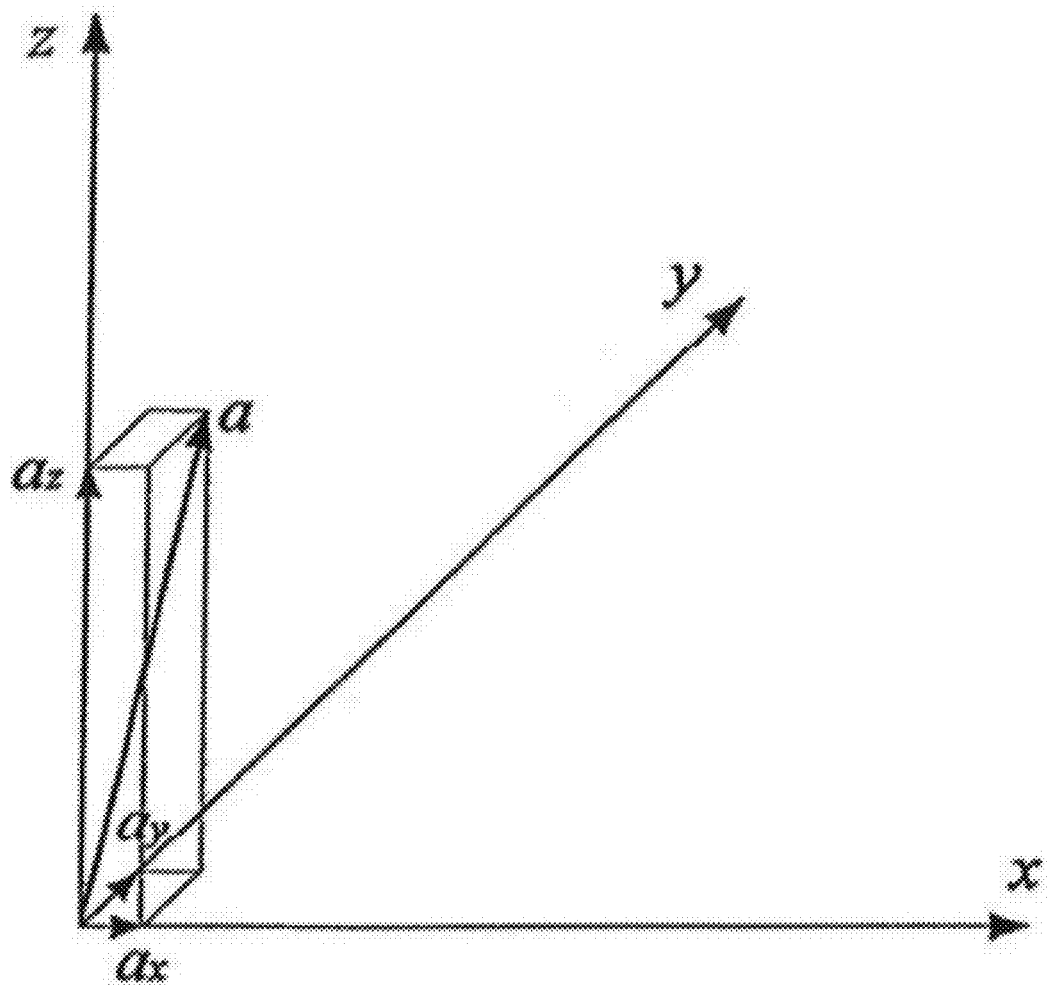
FIG. 2 shows three orthogonal components of an acceleration vector in a 3-dimensional space.

FIG. 2 shows that the magnitude of the overall acceleration, a, experienced by the 3-axis accelerometer 100 is a composite vector of component acceleration vectors in three axes x, y, and z, monitored by the 3-axis accelerometer 100. This may be expressed by Pythagoras' theorem, as follows:

$$\|a\| = \sqrt{a_x^2 + a_y^2 + a_z^2} \qquad (1)$$

where $a_x$, $a_y$, and $a_z$ are the component acceleration values along the three orthogonal axes.

When no gravity is acting on a piezoelectric component, such as when the particular axis monitored by the piezoelectric component is held horizontal to the ground, the ideal piezoelectric component gives 0 mV output, indicating that no force or acceleration is detected. However, in practice, there is always a residual voltage output from the piezoelectric component which contributes to an offset in the piezoelectric component output. Thus, for a 3-axis accelerometer to be accurate, the residual voltage of each piezoelectric component should be determined and subtracted from the voltage output of the piezoelectric component when in use.

Furthermore, as the immediate output of a piezoelectric component is in voltage, V, a gain factor must be multiplied with the voltage in order to convert the voltage into an acceleration or force values. This gain factor, G, being the multiplicative inverse of the "sensitivity", is usually different for each piezoelectric component and therefore different for each axis in the 3-axis accelerometer. The gain factor, G, is also a constant, as the amount of change in the voltage is linearly proportional to the amount of change in acceleration. Thus, for each axis monitored by the 3-axis accelerometer 100, the acceleration values, $a_x$, $a_y$, and $a_z$, detected along each axis have the following relationship with the three output voltages, $V_x$, $V_y$, and $V_z$, minus the zero-gravity offset voltages $V_{x0}$, $V_{y0}$, and $V_{z0}$, $$a_x = G_x(V_x - V_{x0}) \qquad (2a)$$

$$a_y = G_y(V_y - V_{y0}) \qquad (2b)$$

$$a_z = G_z(V_z - V_{z0}) \qquad (2c)$$

where $G_x$, $G_y$, $G_z$ are the respective gain factors, i.e. the inverses of respective sensitivities for the three orthogonal axes, x, y, and z; and $V_{x0}$, $V_{y0}$, $V_{z0}$ are the respective zero-g output voltages for the three orthogonal axes, x, y, and z.

Substituting Equation (2a), (2b) and (2c) into Equation (1), Equation (1) becomes $$a^2 = G_x^2(V_x - V_{x0})^2 + G_y^2(V_y - V_{y0})^2 + G_z^2(V_z - V_{z0})^2 \qquad (3)$$

Figure 3:
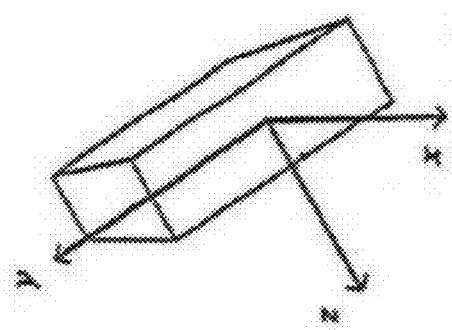
FIG. 3 shows several different orientations of a 3-axis accelerometer.
Figure 3:
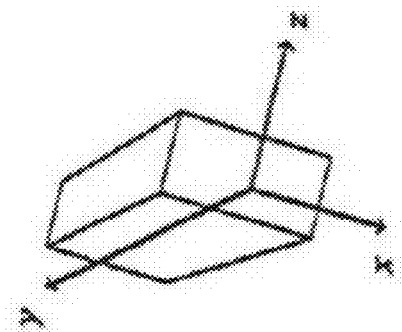
Figure 3:
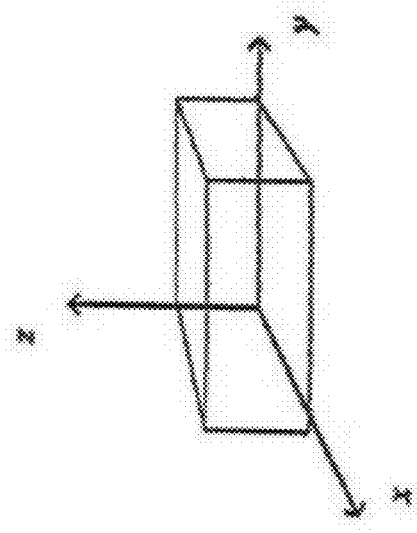

To determine the values of $G_x$, $G_y$, $G_z$, and $V_{x0}$, $V_{y0}$, $V_{z0}$, the 3-axis accelerometer 100 is held still relative to the earth when the voltage outputs representing the forces detected in each axis, $V_x$, $V_y$, $V_z$ are collected from the 3-axis accelerometer by the accuracy improvement unit 110. An exemplary orthogonal coordinates of the 3-axis 100 in three different orientations is illustrated in FIG. 3.

Typically, commercial 3-axis accelerometers should sense only the force of gravity and indicate $\|a\| = 1$ g when they are kept still, relative to the earth. Thus, if the 3-axis accelerometer 100 in this embodiment is held sufficiently still, the voltage readings in all the three axes, x, y, and z, regardless of the orientation of the 3-axis accelerometer 100, should represent component vectors that make up the composite gravity vector of 1 g. Accordingly, the acceleration improvement unit 110 in this embodiment can equate $a^2$ to 1, and Equation (3) becomes $$1 = G_x^2(V_x - V_{xo})^2 + G_y^2(V_y - V_{yo})^2 + G_z^2(V_z - V_{zo})^2 \qquad (4)$$

Equation (4) shows that $G_x$, $G_y$, $G_z$, $V_{x0}$, $V_{y0}$ and $V_{z0}$ are six unknown parameters that may be determined, where $V_x$, $V_y$ and $V_z$ are actual voltage outputs for each axis from the 3-axis accelerometer 100 in any single orientation. Accordingly, Equation (4) may be solved by any suitable mathematical treatments for the values of $G_x$, $G_y$, $G_z$, and $V_{x0}$, $V_{y0}$, $V_{z0}$.

In one possible solution, with a sufficient number of sets of voltage outputs $V_{xm}$, $V_{ym}$ and $V_{zm}$ (m=1 to ≧6) collected from the 3-axis accelerometer in six or more different orientations, a system of equations can be set up and solved to calculate $G_x$, $G_y$, $G_z$, and $V_{x0}$, $V_{y0}$ and $V_{z0}$.

Equation (4) can be expanded to $$[(G_x V_x)^2 + (G_y V_y)^2 + (G_z V_z)^2] + [ \qquad (5)$$
$$-2G_x^2 V_{xo} V_x - 2G_y^2 V_{yo} V_y - 2G_z^2 V_{zo} V_z] + [$$
$$(G_x V_{xo})^2 + (G_y V_{yo})^2 + (G_z V_{zo})^2 - 1] = 0$$

Redefining $\tilde{G}_x = kG_x$, $\tilde{G}_y = kG_y$, $\tilde{G}_z = kG_z$ \qquad (6)

where $k = \dfrac{1}{\sqrt{(G_x V_{xo})^2 + (G_y V_{yo})^2 + (G_z V_{zo})^2 - 1}}$ Equation (5) becomes $$[(\tilde{G}_x V_x)^2 + (\tilde{G}_y V_y)^2 + (\tilde{G}_z V_z)^2] + [-2\tilde{G}_x^2 V_{xo} V_x - 2\tilde{G}_y^2 V_{yo} V_y - 2\tilde{G}_z^2 V_{zo} V_z] + 1 = 0$$

which can be re-expressed as, $$aV_x^2 + bV_y^2 + cV_z^2 + dV_x + eV_y + fV_z = -1 \qquad (7)$$

where
$a = \tilde{G}_x^2$
$b = \tilde{G}_y^2$
$c = \tilde{G}_z^2$
$d = -2\tilde{G}_x^2 V_{xo}$
$e = -2\tilde{G}_y^2 V_{yo}$
$f = -2\tilde{G}_z^2 V_{zo}$ Thus, the problem is thus re-defined to find the variables a, b, c, d, e, f for a given m sets of output voltage values $(V_{x1}, V_{y1}, V_{z1}), (V_{x2}, V_{y2}, V_{z2}), \ldots, (V_{xm}, V_{ym}, V_{zm})$, where m≧6 in this embodiment. Thus, six or more sets of voltage outputs representing vector components in all the three axes, collected from the 3-axis accelerometer 100 in six or more different orientations, are obtained to create a matrix of equations. For example $$A = \begin{bmatrix} V_{x1}^2 & V_{y1}^2 & V_{z1}^2 & V_{x1} & V_{y1} & V_{z1} \\ V_{x2}^2 & V_{y2}^2 & V_{z2}^2 & V_{x2} & V_{y2} & V_{x2} \\ & & \ldots & & & \\ V_{xm}^2 & V_{ym}^2 & V_{zm}^2 & V_{xm} & V_{ym} & V_{zm} \end{bmatrix} \qquad (8)$$

$B^T = [-1 \ldots -1]$ $X^T = [a \ b \ c \ d \ e \ f]$ where a superscript of T stands for transposition of a matrix, and B is an m×1 matrix with all entries being −1.

By way of example, the least-squares method may be used to solve matrix A. For convenience this method is called the "store-and-process calibration method" in this embodiment, because voltage outputs from the six orientations have to be collected and stored before the equations may be solved.

Thus, solving the unknown inverse of sensitivities and zero-g output parameters becomes solving X in $$AX = B \qquad (9)$$

Using the least-squares method, the solution for Equation (9) is $$X = (A^T A)^{-1} A^T B \qquad (10)$$

After the solution of X is found, the variables a, b, c, d, e, f and thus the scaled inverse of sensitivities and the zero-g outputs $\tilde{G}_x$, $\tilde{G}_y$, $\tilde{G}_z$, $V_{xo}$, $V_{yo}$, $V_{zo}$ can be determined, and the actual inverse of sensitivities $G_x$, $G_y$, $G_z$ can then be calculated according to (6).

Accordingly, the voltage outputs from the 3-axis accelerometer can now be calibrated corrected or adjusted by the values of $G_x$, $G_y$, $G_z$, $V_{x0}$, $V_{y0}$ and $V_{z0}$. That means, all subsequent voltage outputs $V_x$, $V_y$ and $V_z$ of the 3-axis accelerometer 100, after $G_x$, $G_y$, $G_z$, $V_{x0}$, $V_{y0}$ and $V_{z0}$ have been determined, are fed into the accuracy improvement unit 110 to be treated with values of $G_x$, $G_y$, $G_z$, $V_{x0}$, $V_{y0}$ and $V_{z0}$, according to equations (2a), (2b) and (2c). This is illustrated in FIG. 1, showing that the zero-g offset value of each axis, $V_{x0}$, $V_{y0}$ and $V_{z0}$, is subtracted, at 120, from the actual voltage readings of the 3-axis accelerometer 100, $V_x$, $V_y$ and $V_z$, before being multiplied, at 130, by the sensitivity or gain factors, $G_x$, $G_y$, $G_z$.

In this way, $a_x$, $a_y$, and $a_z$, indicating the force vector in each of the axes are accurately adjusted and may be used to calculate a composite vector according to Equation (1).

Figure 4:
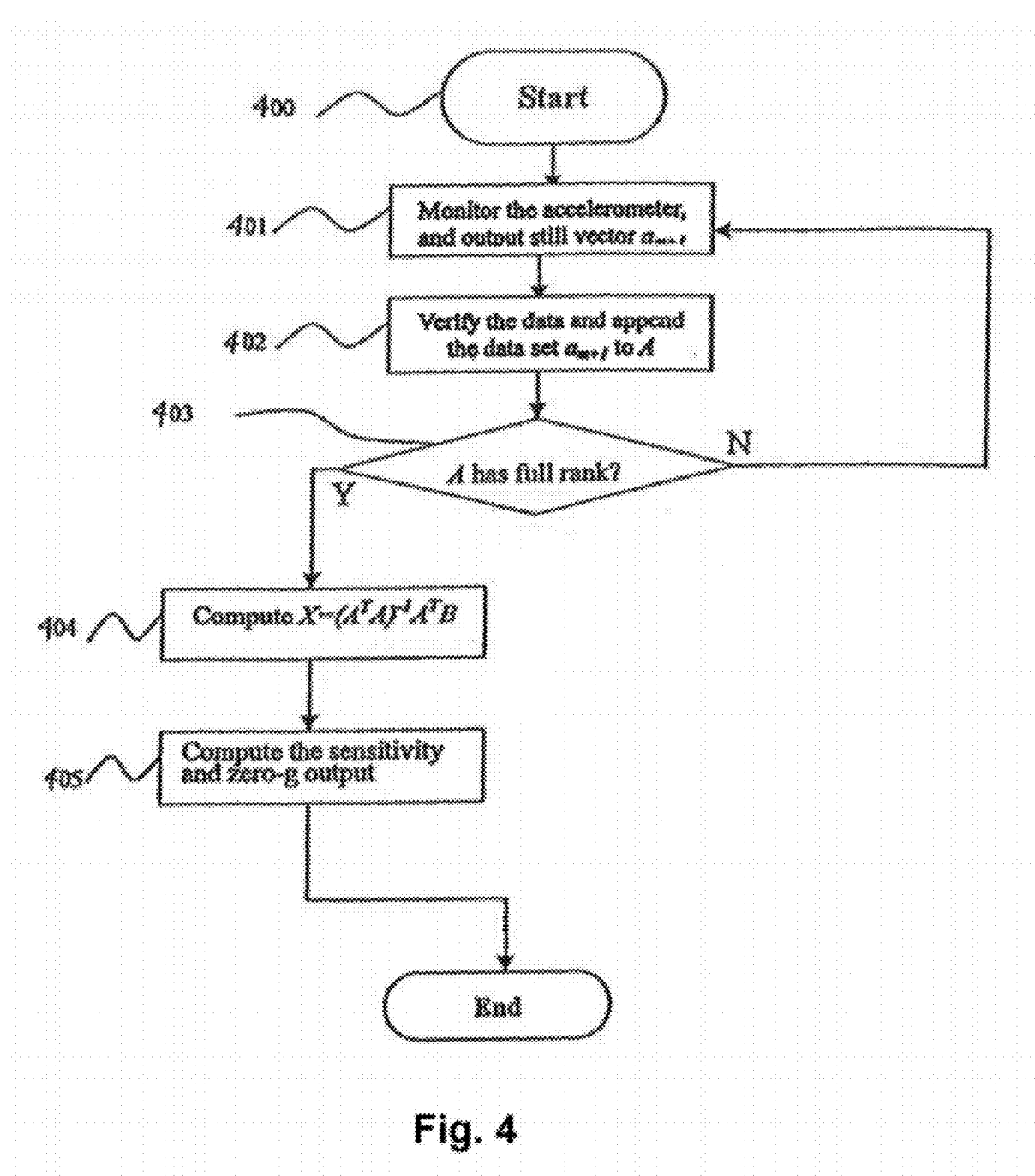
FIG. 4 is a flowchart for calibrating an accelerometer according to a first embodiment of the invention.

FIG. 4 is a flowchart illustrating the steps of obtaining $G_x$, $G_y$, $G_z$, $V_{x0}$, $V_{y0}$ and $V_{z0}$ according to the described method, in which the accuracy improvement unit 110 uses the least-squares mathematical treatment, or the "store and process" method, to calibrate the outputs of the 3-axis accelerometer 100.

The process is triggered by a command issued through the input unit 530, in step 400. When so triggered, the accuracy improvement unit 110 obtains the voltage outputs of the 3-axis accelerometer 100 $V_x$, $V_y$, $V_z$, in step 401.

Subsequently, the accuracy improvement unit 110 pre-processes the voltage outputs $V_x$, $V_y$, $V_z$, are to verify if the voltage outputs have been collected when the 3-axis accelerometer 100 is sufficiently still, at step 402.

During pre-processing for verification, at step 402, the voltage outputs $V_x$, $V_y$, $V_z$, are converted to values representing acceleration forces experienced along each axis $a_x$, $a_y$, and $a_z$, using the existing, pre-calibration or pre-adjusted, sensitivity and zero-g values. The acceleration forces $a_x$, $a_y$, and $a_z$, are then used to calculate the composite acceleration vector, a, accordingly to Equation (1). Even if the component acceleration forces $a_x$, $a_y$, and $a_z$, are not accurate because the sensitivity factors G and zero-g values $V_0$ have shifted and have not yet been adjusted or calibrated, the composite force vector should not deviate too far from 1 g if the 3-axis accelerometer 100 is held sufficiently still. Thus, if the composite vector is larger than 1 g beyond a pre-determined threshold value the output from the 3-axis accelerometer 100 is taken to have been obtained when the 3-axis accelerometer 100 is moving and is disregarded. In this way, the accuracy improvement unit 110 is able to determine if the voltage values $V_x$, $V_y$, $V_z$, were obtained when the 3-axis accelerometer 100 is held sufficiently still. On the other hand, if the value of the composite vector, a, is within the pre-determined threshold value and is thus deemed acceptable, the accuracy improvement unit 110 then checks, in step 403, to see if the number of sets of acceptable voltage outputs collected from the 3-axis accelerometer 100 is enough to make up a full rank matrix A described in Equation (9). If not, the accuracy improvement unit 110 waits for another set of voltage outputs from the 3-axis accelerometer 100, at step 401.

Preferably, the embodiment has a visual display indicating the number of sets of voltage outputs collected and verified acceptable. Thus, the user is guided to hold the 3-axis accelerometer 100 still in yet another orientation to collect a further set of voltage outputs, until a full rank matrix A is provided by sufficient sets of voltage outputs.

When sufficient sets of voltage outputs have been collected to provide a full-rank matrix A, Equation (10) is used to deduce a unique X value. If the matrix is not full rank, it will not be possible to solve Equation (10) for X, as there will be zero or infinite solutions.

Optionally, the embodiment is also able to detect if the 3-axis accelerometer 100 has been rotated into a new orientation, by monitoring the composite vectors detected by the 3-axis accelerometer 100. The voltage output of either one or all of the axes, x, y, and z should change significantly as the 3-axis accelerometer 100 is being moved or rotated into a different orientation. Thus, the accuracy improvement unit 110 rejects voltage outputs from the 3-axis accelerometer 100 if the accuracy improvement unit 110 does not detect a preceding change in the 3-axis accelerometer 100 orientation. Typically, detection of the 3-axis accelerometer having been rotated into a new orientation is required only after the first voltage output set collected by the accuracy improvement unit 110, since at the collection of the first voltage output set, the 3-axis accelerometer 100 is expected to be already held in place before the calibration is triggered.

If it is determined that sufficient sets of voltage outputs in different orientations have been collected from the 3-axis accelerometer such that the matrix A has full rank, at step 403, the value of X in Equation (10) is then calculated, at step 404, and the sensitive and zero-g output of the piezoelectric component of each axis of the 3-axis accelerometer 100 is computed using Equation (6) and Equation (7), at step 405.

Optionally, after the "store and process" method is used, the oldest set of voltage outputs is discarded, to be replaced by the next single set of voltage outputs taken from the 3-axis accelerometer 100 at the next calibration trigger, to make up a full rank matrix A of Equation (9) having one new rank.

Although six data sets have been described as required for making up full rank matrix A, the skilled man would understand that, depending on the situation, more than 6 data sets may be required to make up the fill rank matrix A.

An alternative way to verify the voltage outputs, i.e. confirm if the 3-axis accelerometer 100 was sufficiently still when the voltage outputs were collected, is to obtain the mean values and standard deviations of a specific number of sets of voltage outputs of each axis, collected continually in quick succession within a short period of time. If the deviation between the voltage outputs of each axis is smaller than a pre-determined threshold value, this indicates that the quick succession of voltage outputs were collected when 3-axis accelerometer 100 was sufficiently still, and the mean voltage output of each of the axes, is collected by the accuracy improvement unit 110 for building matrix A. Conversely, if the deviation is higher then the pre-determined threshold value for any one of the axes, then the 3-axis accelerometer voltage outputs are continually monitored until a quick succession of voltage outputs of each axis is obtained which has a deviation is smaller than the threshold value.

Figure 5:
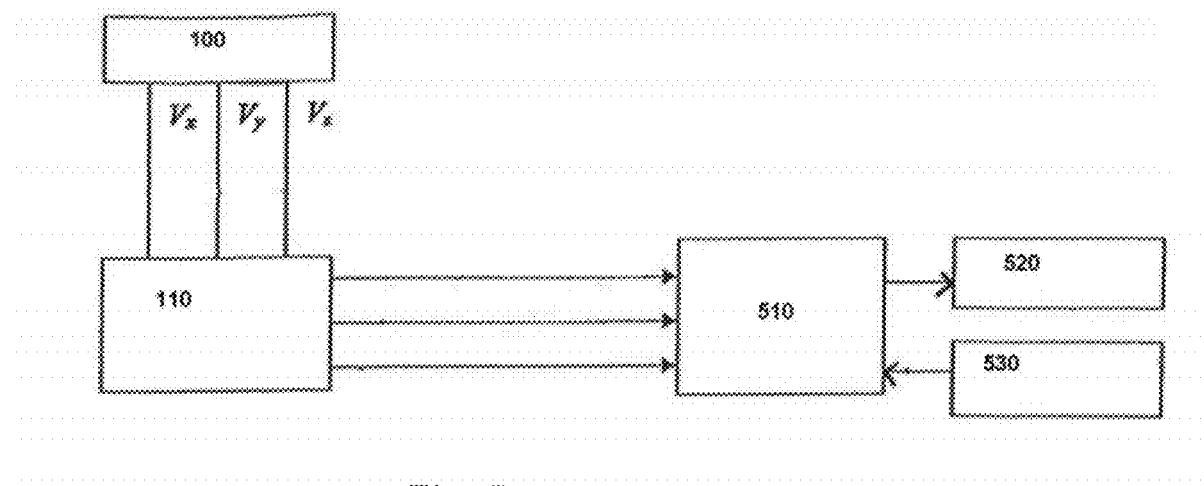
FIG. 5 is a system block diagram of a device utilizing the embodiment of FIG. 4.

FIG. 5 illustrates how the embodiment may be constructed physically, showing a 3-axis accelerometer 100 configured to send its voltage outputs $V_x$, $V_y$, and $V_z$ for each of the axes, x, y, and z to an accuracy improvement unit 110. The outputs of the accelerometer are therefore fed into the accuracy improvement unit 110 for calibration or post-calibration adjustment before being output by the accuracy improvement unit 110. In FIG. 5, the accuracy improvement unit 110 is a physical unit separable from the 3-axis accelerometer 100. In this case, the accuracy improvement unit 110 is an independent device having its own processing capabilities.

For the purpose of the "store and process" method, the accuracy improvement unit 110 includes a memory (not illustrated) to store consecutive sets of voltage output, in order that a full rank matrix may be provided from a sufficient number of voltage output sets.

FIG. 5 also shows a "further processing" unit 510, which is separate from both the 3-axis accelerometer and the accuracy improvement unit 110. The further processing unit 510 processes the adjusted acceleration vectors, $a_x$, $a_y$, and $a_z$, from the accuracy improvement unit 110, to deduce movements detected by the 3-axis accelerometer 100. How such a further processing unit 510 works depends on the practical application of the accelerometer and the skilled man is well aware of such applications.

Preferably, the embodiment includes an output unit 520 for displaying information to the user. For example, the output unit 520 has a display to alert the user that the 3-axis accelerometer 100 is undergoing calibration and, optionally, indicate a count of the number of voltage output sets that have been collected for the calibration. The output unit 520 may be an LCD or LED panel.

FIG. 5 shows the output unit 520 coupled to the further processing unit 510. Optionally, however, the output unit 520 may be coupled directly to the accuracy improvement unit 110 (this is not illustrated).

FIG. 5 also shows the embodiment including an input unit 530 for triggering the calibration. Optionally, the input unit 530 is a button which triggers the calibration when pressed. However, alternative triggering methods may be used. For example, a time-based trigger may start a calibration automatically without the user being aware. When calibration is started by such a time trigger, the accuracy improvement unit 110 continuously monitors whether the 3-axis accelerometer 100 is held still, in order to obtain, verify and accept voltage outputs which are indicative of the component vectors of 1 g. This is repeated at least six times, depending on how many sets of data are required to make up a full rank matrix. Preferably, each collection of voltage outputs from the 3-axis accelerometer 100 is preceded by a detection of the 3-axis accelerometer 100 having being rotated into a new orientation.

Figure 5A:
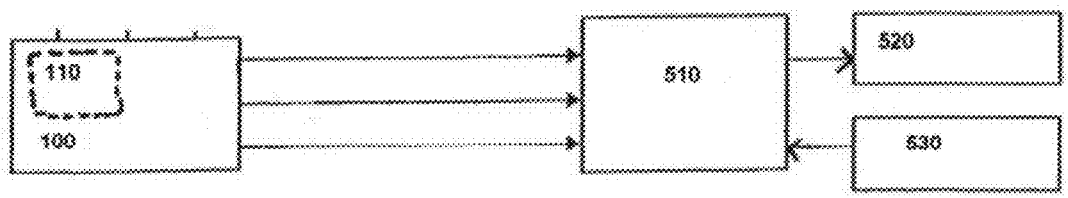
FIG. 5a is a variation of the system block diagram of FIG. 5.

FIG. 5a shows a variation of the embodiment to that of FIG. 5, in which the accuracy improvement unit 110 is in the form of software which is embedded within the 3-axis accelerometer 100. For example, the accuracy improvement unit 110 is a firmware written into a processor unit, not illustrated, inside the 3-axis accelerometer 100. In this case, the 3-axis accelerometer 100 and the accuracy improvement unit 110 is one integral unit providing output directly to a further processing unit 510. In such an embodiment, the accuracy improvement unit 110 is combined with the 3-axis accelerometer 100 to possibly save hardware cost.

Accordingly, an embodiment has been described, which uses detected component force vectors in the three axes monitored by a 3-axis accelerometer 100 to determine the zero-g output and sensitivity along each axis.

In a second embodiment of the invention, a "stepwise" calibration employing recursive least-squares method may be used, which requires only one voltage output set ($V_x$, $V_y$, $V_z$) to compute the 3-axis accelerometer's sensitivity and zero-gravity value. This means that collecting enough sets of voltage outputs to construct a full-rank matrix A is not necessary.

The mathematical nature of the recursive-least-squares calculation is generally well known and need not be elaborated on in detail. To compute the solution using recursive least-squares, an initial matrix of guess values, $x_0$, is used. This guess value, $x_0$, may be obtained from the initial or typical zero-g voltage outputs and the sensitivity of each of the axis of the 3-axis accelerometer 100, usually established by the manufacturer and provided in the manufacturer datasheet. Table 1 gives and example of a part of a manufacturer datasheet, indicating the typical, minimum and maximum values of the sensitivities and zero-g output voltages of the x axis of a Freescale MMA7361L 3-axis, established during calibration in the factory.

TABLE 1

| x axis | Minimum | Typical | Maximum |
|---|---|---|---|
| Zero-g output voltage (mV) | 1485 | 1650 | 1815 |
| Sensitivity (mV/g) | 190.6 | 206 | 221.5 |

Thus, let $a_0$ represent a column vector of $(V_{x0}^2, V_{y0}^2, V_{z0}^2, V_{x0}, V_{y0}, V_{z0})$; and $P_0$ represent a 6-by-6 diagonal matrix with large entries (typically $10^{12}$ for double precision calculation)

Accordingly, to solve Equation (9), the following iterative equation can be computed, $$X_{m+1} = X_m + k(B_{m+1} - A_{m+1}^T X_m) \quad (11)$$

where $$k = \frac{1}{1 + a_{m+1}^T a_m A_{m+1}} P_m a_{m+1}; \text{ and}$$

$$P_0 = \begin{bmatrix} 10^{12} & & & & \\ & 10^{12} & & 0 & \\ & & \ddots & & \\ & 0 & & 10^{12} & \\ & & & & 10^{12} \end{bmatrix}$$

and $$P_{m+1} = [I - k a_{m+1}^T] P_m \quad (12)$$

From the above elaboration, every time a new data set ($V_x$, $V_y$, $V_z$) is obtained and verified, a new row ($V_{x,m+1}^2$, $V_{y,m+1}^2$, $V_{z,m+1}^2$, $V_{x,m+1}$, $V_{y,m+1}$, $V_{z,m+1}$) can be computed and appended to the matrix $A_m$ (see Equation (8)) to generate matrix $A_{m+1}$. The matrix $B_{m+1}$ is a (m+1) by 1 matrix with all entries being −1.

With a known present solution $A_m$, one can use Equation (11) to obtain a new solution $X_{m+1}$. From the result of $X_{m+1}$ (variables a, b, c, d, e, f), one can resolve $G_x$, $G_y$, $G_z$, $V_{x0}$, $V_{y0}$ and $V_{z0}$ using equation (6) and (7).

The described second method and embodiment is simply another method to solve Equation (9), in the event that the data sets are insufficient to construct the full-rank matrix A to solve Equation (10). The skilled man will know that other embodiments may use different mathematical treatments to determine the values of $G_x$, $G_y$, $G_z$, $V_{x0}$, $V_{y0}$ and $V_{z0}$, and these should be well-known to the skilled man and need not be discussed here.

Figure 6:
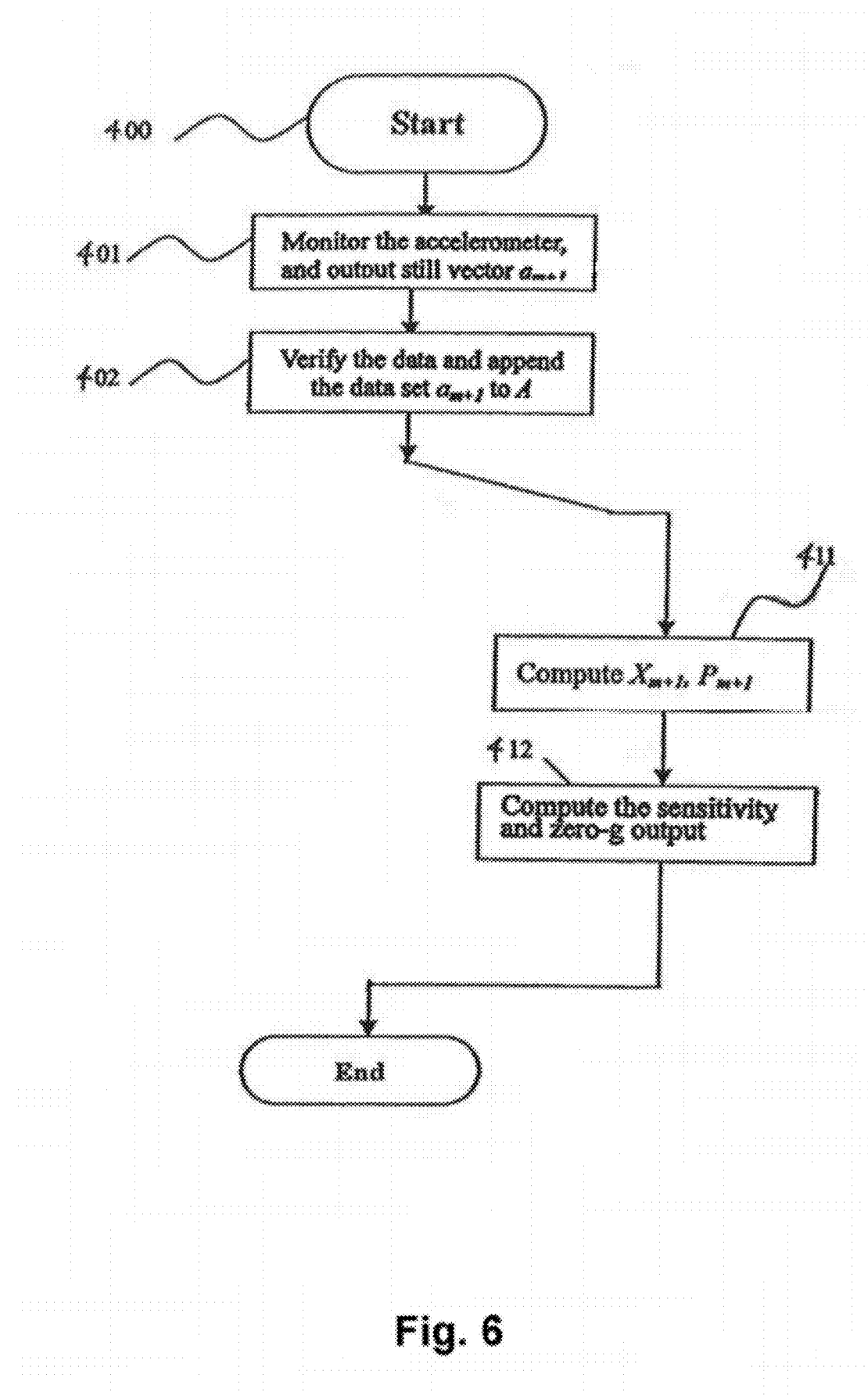
FIG. 6 is a flowchart for calibrating an accelerometer according to a second embodiment of the invention.
Figure 7:
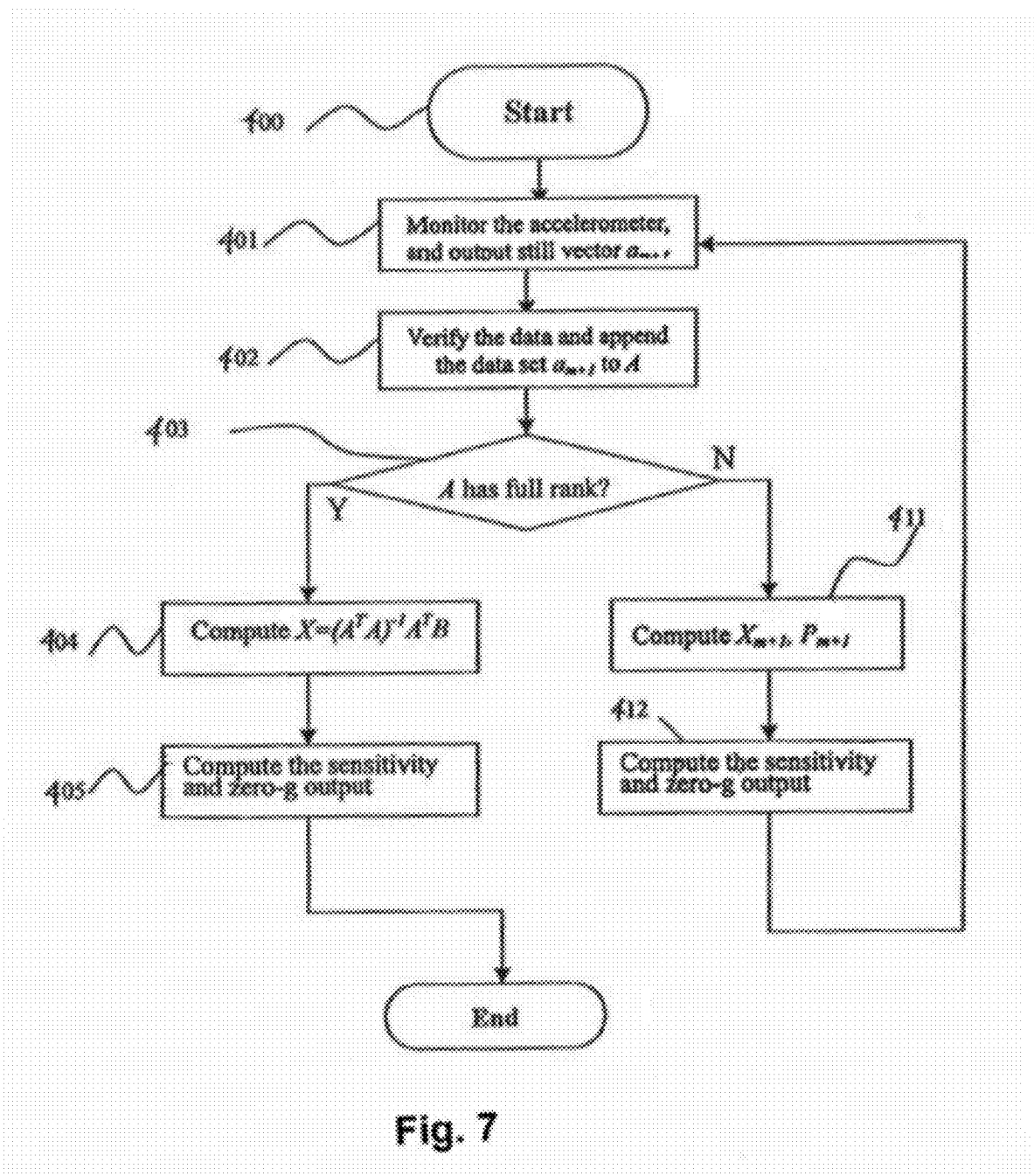
FIG. 7 is a flowchart for calibrating an accelerometer according to a third embodiment of the invention, combining the first and second embodiments of FIGS. 4 and 6.

FIG. 6 is a flowchart showing how the second embodiment is implemented. As in the first embodiment, the calibration is triggered by the user pressing on a push button or by a timer-trigger, in step 400.

Subsequently, a set of voltage outputs from the 3-axis accelerometer 100 is obtained, and the voltage outputs are used to determine a composite vector, at step 401. As in the first embodiment, the composite vector is compared to a threshold value for verification that the voltage output was obtained when the 3-axis accelerometer 100 was sufficiently still, in step 402.

Then, the manufacturer's indication of the original $G_x$, $G_y$, $G_z$, $V_{x0}$, $V_{y0}$ and $V_{z0}$ of the 3-axis accelerometer 100 is used to compute $X_{m+1}$, according to Equations (11) and (12), in step 411. Typically, the original $G_x$, $G_y$, $G_z$, $V_{x0}$, $V_{y0}$ and $V_{z0}$ of the 3-axis accelerometer 100 are pre-stored in the accuracy improvement unit 110. Alternatively, the existing $G_x$, $G_y$, $G_z$, $V_{x0}$, $V_{y0}$ and $V_{z0}$ values, obtained by the last calibration of the 3-axis accelerometer 100, can also be used.

Subsequently, new or adjusted values of $G_x$, $G_y$, $G_z$, $V_{x0}$, $V_{y0}$ and $V_{z0}$ are determined using the values of $X_{m+1}$, at step 412, according to Equation (6) and Equation (7). The newly determined values of $G_x$, $G_y$, $G_z$, $V_{x0}$, $V_{y0}$ and $V_{z0}$ are then applied to adjust subsequent voltage outputs of the 3-axis accelerometer 100, as illustrated in FIG. 1, at 120, 130.

Generally, the recursive-least-squares method would provide a faster method of calibrating the 3-axis accelerometer 100, which requires less memory and processing.

In a further embodiment, the accuracy improvement unit 110 has both "store and process" and "step wise" calibration methods. As in the first embodiment, the calibration is triggered by the user pressing on a push button or by a timer-trigger, in step 400. When so triggered, the accuracy improvement unit 110 obtains the voltage output of the 3-axis accelerometer 100 $V_x$, $V_y$, $V_z$, in step 401. Subsequently, the voltage output $V_x$, $V_y$, $V_z$, are pre-processed to verify if they have been collected when the 3-axis accelerometer 100 is sufficiently still, at step 402. If the composite vector, a, made of the component vectors deduced from $V_x$, $V_y$, $V_z$, is deemed to have been collected when the 3-axis accelerometer 100 was sufficiently still, in step 402, the values of $V_x$, $V_y$, $V_z$ are stored into a memory, not illustrated, of the accuracy improvement unit 110.

The memory stores the voltage outputs from the previous calibrations, such that, if it is determined, at step 403, that there is a insufficient number of voltage output sets in the memory of the accuracy improvement unit 110 to construct a full rank matrix, the "step-wise" method, using the recursive least squares method, at steps 411 and 412, is used to calibrate the output of the 3-axis accelerometer. After six or more calibrations using the "step-wise" method, there is a sufficient number of voltage output sets in the memory to construct a full rank matrix, and the "store and process" method is used instead of the "step-wise" method to determined values of $G_x$, $G_y$, $G_z$, $V_{x0}$, $V_{y0}$ and $V_{z0}$ for adjusting the output of the 3-axis accelerometer, at steps 404 and 405.

Preferably, the switching between the "step-wise method" to the "store and process" method, at step 403, is done automatically without user intervention. However, it is also possible that the user is prompted before either method is selected, for example, the user is prompted by a message at the display unit 520 to select between the methods by the input unit 530.

Optionally, after the "store and process" method is used, all the sets of voltage outputs in the memory are cleared for a fresh matrix to be collected from the next several calibrations using the "step-wise" method.

Table 2 shows an exemplary result of using the third embodiment, having both the methods, to calibrate the 3-axis accelerometer 100. It can be clearly seen that the zero-g output or sensitivity is different for each axis, and there is a significant deviation from the typical value provided by the manufacturer. Thus, this shows that an effective calibration method performed regularly by the user is essential to improve the accuracy of 3-axis accelerometers.

TABLE 2

|  | x-axis | y-axis | z-axis | Typical |
|---|---|---|---|---|
| Zero-g output voltage (mV) | 1535 | 1711 | 1549 | 1650 |
| Sensitivity (mV/g) | 205.2 | 207.7 | 197.6 | 206 |

Accordingly, a method of calibrating the accuracy of a 3-axis accelerometer 100 has been described, which comprises the steps of holding the 3-axis accelerometer 100 in an orientation and relatively still to the earth, obtaining 3-axis accelerometer 100 outputs, $V_x$, $V_y$, $V_z$ for each respective axis x, y, z, equating outputs, $V_x$, $V_y$, $V_z$ to gravitational force of 1 g according to the equation, $$1 = G_x^2(V_x - V_{xo})^2 + G_y^2(V_y - V_{yo})^2 + G_z^2(V_z - V_{zo})^2;$$

where
- $G_x$=gain of the 3-axis accelerometer 100 along the x axis;
- $G_y$=gain of the 3-axis accelerometer 100 along the y axis;
- $G_z$=gain of the 3-axis accelerometer 100 along the z axis;
- $V_{x0}$=zero-g output of the x axis;
- $V_{y0}$=zero-g output of the y axis;
- $V_{z0}$=zero-g output of the z axis;

solving the values of $G_x$, $G_y$, $G_z$, $V_{x0}$, $V_{y0}$ and $V_{z0}$, whereby subsequent 3-axis accelerometer 100 output is treated by the values of $G_x$, $G_y$, $G_z$, $V_{x0}$, $V_{y0}$ and $V_{z0}$ to obtain the component force vectors, $a_x$, $a_y$, $a_z$, along the axes of x, y and z, according to the relationship, $a_x = G_x(V_x - V_{x0})$, $a_y = G_y(V_y - V_{y0})$ and $a_z = G_z(V_z - V_{z0})$.

Furthermore, an embodiment has been described, which comprises an accuracy improvement unit 110 for a 3-axis accelerometer 100 comprising an x input for receiving a $V_x$ output from the 3-axis accelerometer 100 representing the force acting on an x axis, a y input for receiving a $V_y$ output from the 3-axis accelerometer 100 representing the force acting on a y axis, a z input for receiving a $V_z$ output from the 3-axis accelerometer 100 representing the force acting on a z axis, the accuracy improvement unit 110 being capable of treating outputs $V_x$, $V_y$, $V_z$ as indicative of component vectors of an acceleration force of 1 g according to the relationship:

$$1 = G_x^2(V_x - V_{xo})^2 + G_y^2(V_y - V_{yo})^2 + G_z^2(V_z - V_{zo})^2$$

- $G_x$=sensitivity of the accelerometer along the x axis;
- $G_y$=sensitivity of the accelerometer along the y axis;
- $G_z$=sensitivity of the accelerometer along the z axis;
- $V_{x0}$=zero-g output the x axis;
- $V_{y0}$=zero-g output the y axis; and
- $V_{z0}$=zero-g output the z axis;

the processing unit is capable of determining $G_x$, $G_y$, $G_z$, $V_{x0}$, $V_{y0}$ and $V_{z0}$ from said relationship, wherein the accuracy improvement unit 110 being further capable of applying $G_x$, $G_y$, $G_z$, $V_{x0}$, $V_{y0}$ and $V_{z0}$ to subsequent outputs $V_x$, $V_y$, $V_z$ from the accelerometer to provide component force vectors $a_x$, $a_y$, $a_z$, according to the relationships, $a_x = G_x(V_x - V_{x0})$, $a_y = G_y(V_y - V_{y0})$ and $a_z = G_z(V_z - V_{z0})$.

Embodiments of the invention have been described, but these are not intended to limit the scope of use or functionality of the invention. Other embodiments of the invention, though not described, are envisaged and improvements and modifications obvious to those skilled in the art do not depart from the scope of the invention.

For example, it has been described that the accuracy improvement unit 110 outputs adjusted component acceleration values, $a_x$, $a_y$, $a_z$ to the further processing unit 510. However, it is also possible that the accuracy improvement unit 110 outputs adjusted voltage outputs $V_x$, $V_y$ and $V_z$, which has been subtracted of the voltage offset $V_{x0}$, $V_{y0}$ and $V_{z0}$ to the further processing unit 510, without multiplying with the gain values $G_x$, $G_y$, $G_z$. In this case, the further processing unit 510 may perform the multiplication of the adjusted voltage outputs $V_x$, $V_y$ and $V_z$ with the gain values $G_x$, $G_y$, $G_z$. Furthermore, it is also possible that the accuracy improvement unit 110 performs all the calculation to deduced and output the composite vector, a, to the further processing unit 510 for practical applications.

Furthermore, the skilled man will understand that the voltage output from the 3-axis accelerometer 100 could be either analogous or digital. Furthermore, if the output signal is analogous, the signal may be converted to a digital signal for the discussed numerical treatment.

Furthermore, the skilled man will understand that while "voltage" is described as the output from the 3-axis accelerometer 100, signal outputs from the 3-axis accelerometer 100 in various other units, such as current, resistance or other electrical units, is possible as long as the type of signal output represent the force detected by the 3-axis accelerometer 100.

Furthermore, the terms 'calibration', 'correction' and 'adjustment' of the 3-axis accelerometer or its outputs are used interchangeable to mean increasing the accuracy of the 3-axis accelerometer, as would be understood by the skilled reader.

The invention claimed is:

1. A method of calibrating the accuracy of a 3-axis accelerometer comprising the steps of:
   a) holding the 3-axis accelerometer in an orientation and relatively still to the earth;
   b) obtaining 3-axis accelerometer outputs, $V_x$, $V_y$, $V_z$, for each respective axis x, y, z;
   c) equating outputs $V_x$, $V_y$, $V_z$ to gravitational force of 1 g according to the equation, $$1 = G_x^2(V_x - V_{xo})^2 + G_y^2(V_y - V_{yo})^2 + G_z^2(V_z - V_{zo})^2;$$

where
   - $G_x$=gain of the 3-axis accelerometer along the x axis;
   - $G_y$=gain of the 3-axis accelerometer along the y axis;
   - $G_z$=gain of the 3-axis accelerometer along the z axis;
   - $V_{x0}$=zero-g output of the x axis;
   - $V_{y0}$=zero-g output of the y axis;
   - $V_{z0}$=zero-g output of the z axis;

d) solving the values of $G_x$, $G_y$, $G_z$, $V_{x0}$, $V_{y0}$ and $V_{z0}$;
   whereby
   subsequent 3-axis accelerometer output is treated by the values of $G_x$, $G_y$, $G_z$, $V_{x0}$, $V_{y0}$ and $V_{z0}$ to obtain the component force vectors, $a_x$, $a_y$, $a_z$, along the axes of x, y and z, according to the relationship:

$$a_x = G_x(V_x - V_{x0});$$

$$a_y = G_y(V_y - V_{y0}); \text{ and}$$

$$a_z = G_z(V_z - V_{z0}).$$

2. A method of calibrating the accuracy of a 3-axis accelerometer as claimed in claim 1, further comprising the steps of:
   e) repeating steps a) to c) to obtain and store outputs $V_{xm}$, $V_{ym}$, $V_{zm}$ (m=1 to $\geq 6$) from the 3-axis accelerometer in the $m^{th}$ orientation to provide a full rank matrix, in order to obtaining the values of $G_x$, $G_y$, $G_z$, $V_{x0}$, $V_{y0}$ and $V_{z0}$ from the full rank matrix.

3. A method of calibrating the accuracy of a 3-axis accelerometer as claimed in claim 1,
   wherein solving out the values of $G_x$, $G_y$, $G_z$, $V_{x0}$, $V_{y0}$ and $V_{z0}$ comprises using the least-squares method.

4. A method of calibrating the accuracy of a 3-axis accelerometer as claimed in claim 2, wherein
   if $m \geq 6$ at step e) and if the number of stored sets of $V_{xm}$, $V_{ym}$, $V_{zm}$ are enough to provide a full rank matrix, the method of claim 2 is used; and
   if m<6 at step e), the method of claim 3 is used.

5. A method of calibrating the accuracy of a 3-axis accelerometer as claimed in claim 4, further comprising the steps of:
   detecting that the accelerometer is rotated into a new orientation before collecting the outputs, $V_{xm}, V_{ym}, V_{zm}$ in step (e).

6. A method of calibrating the accuracy of a 3-axis accelerometer as claimed in claim 1, wherein
   determining that the 3-axis accelerometer is held still in the orientation comprises the steps of:
   calculating the composite acceleration vector represented by $V_x, V_y, V_z$;
   wherein
   the 3-axis accelerometer is deemed to be still if the composite acceleration vector is within a pre-determined threshold value.

7. A method of calibrating the accuracy of a 3-axis accelerometer as claimed in claim 1, wherein determining that the 3-axis accelerometer is held still in the orientation comprises the steps of:
   collecting a plurality of accelerometer outputs for each axis within a pre-determined period of time,
   calculating the mean and standard deviation between the plurality of accelerometer outputs; and
   if the standard deviation between the plurality of accelerometer outputs is within a pre-determined threshold, the accelerometer output is deemed to have been collected with the accelerometer being sufficiently still, whereby the mean value of the outputs for each axis is accepted as accelerometer output, $V_x, V_y, V_z$ in step (b).

8. A method of calibrating the accuracy of a 3-axis accelerometer as claimed in claim 1, wherein the method is triggered by a timer.

9. An accuracy improvement unit for a 3-axis accelerometer comprising
   an x input for receiving a $V_x$ output from the 3-axis accelerometer representing the force acting on an x axis;
   a y input for receiving a $V_y$ output from the 3-axis accelerometer representing the force acting on a y axis;
   a z input for receiving a $V_z$ output from the 3-axis accelerometer representing the force acting on a z axis;
   the accuracy improvement unit being capable of treating outputs $V_x, V_y, V_z$ as indicative of component vectors of an acceleration force of 1 g according to the relationship:

$$1 = G_x^2(V_x-V_{xo})^2 + G_y^2(V_y-V_{yo})^2 + G_z^2(V_z-V_{zo})^2$$

$G_x$=sensitivity of the accelerometer along the x axis;
   $G_y$=sensitivity of the accelerometer along the y axis;
   $G_z$=sensitivity of the accelerometer along the z axis;
   $V_{x0}$=zero-g output the x axis;
   $V_{y0}$=zero-g output the y axis; and
   $V_{z0}$=zero-g output the z axis;
   the processing unit is capable of determining $G_x, G_y, G_z, V_{x0}, V_{y0}$ and $V_{z0}$ from said relationship;
   wherein
   the accuracy improvement unit being further capable of applying $G_x, G_y, G_z, V_{x0}, V_{y0}$ and $V_{z0}$ to subsequent outputs $V_x, V_y, V_z$ from the accelerometer to provide component force vectors $a_x, a_y, a_z$ according to the relationship:

$$a_x = G_x(V_x - V_{xo})$$

$$a_y = G_y(V_y - V_{yo})$$

$$a_z = G_z(V_z - V_{zo}).$$

10. An accuracy improvement unit for a 3-axis accelerometer as claimed in claim 9, wherein
    the accuracy improvement unit is capable of storing m sets of outputs $V_{zm}, V_{ym}, V_{zm}$;
    the accuracy improvement unit is capable of providing a full rank matrix from m (m=1 to $\geq$6) sets of outputs $V_{zm}, V_{ym}, V_{zm}$ to determine $G_x, G_y, G_z, V_{x0}, V_{y0}$ and $V_{z0}$;
    wherein
    the m sets of outputs are obtained when the 3-axis accelerometer is held relatively still to the earth, in respective m orientations.

11. An accuracy improvement unit for a 3-axis accelerometer as claimed in claim 9, wherein
    solving out the values of $G_x, G_y, G_z, V_{x0}, V_{y0}$ and $V_{z0}$ comprises using the least squares method.

12. An accuracy improvement unit for a 3-axis accelerometer as claimed in claim 9, wherein
    the values of $G_x, G_y, G_z, V_{x0}, V_{y0}$ and $V_{z0}$ are solved by the method of claim 11 if the stored m sets of $V_{zm}, V_{ym}, V_{zm}$ are not sufficient to provide a full rank matrix; and
    the values of $G_x, G_y, G_z, V_{x0}, V_{y0}$ and $V_{z0}$ are solved by the method of claim 10 if the stored m sets of $V_{zm}, V_{ym}, V_{zm}$ are sufficient to provide a full rank matrix.

13. An accuracy improvement unit for a 3-axis accelerometer as claimed in anyone of claim 9, further comprising
    an output unit for indicating the count of m.

14. An accuracy improvement unit for a 3-axis accelerometer as claimed in anyone of claim 9, further comprising
    an input device for triggering the start of a calibration.

15. An accuracy improvement unit for a 3-axis accelerometer as claimed in anyone of claim 9, further comprising
    a time-based trigger for starting calibration at a pre-determined time.

16. An accuracy improvement unit for a 3-axis accelerometer as claimed in anyone of claim 9, wherein
    the accuracy improvement unit determines that the 3-axis accelerometer is rotated into a new orientation before collecting the outputs $V_x, V_y, V_z$.

17. An accuracy improvement unit for a 3-axis accelerometer as claimed in anyone of claim 9, wherein:
    the accuracy improvement unit determines that the 3-axis accelerometer is held still before collecting outputs $V_x, V_y, V_z$.

18. An accuracy improvement unit for a 3-axis accelerometer as claimed in claim 17, wherein
    the accuracy improvement unit determines that the 3-axis accelerometer is held still if $V_x, V_y, V_z$ indicate a composite vector within an acceptable value.

19. An accuracy improvement unit for a 3-axis accelerometer as claimed in claim 17, wherein
    the accuracy improvement unit determines that the 3-axis accelerometer is held still in an orientation if a plurality of successive accelerometer outputs collected within a pre-determined period of time for each axis has a standard deviation within a pre-determined threshold;
    wherein
    the mean value of the plurality of successive accelerometer outputs for each axis is accepted as accelerometer outputs, $V_x, V_y, V_z$.

20. An accuracy improvement unit for a 3-axis accelerometer as claimed in anyone of claim 9, wherein
    the accuracy improvement unit is a separate device to be connected to the 3-axis accelerometer for use.

21. An accuracy improvement unit for a 3-axis accelerometer as claimed in claim 9, wherein
    the accuracy improvement unit is integrated with or embedded in the 3-axis accelerometer.

22. An accuracy improvement unit for a 3-axis accelerometer as claimed in claim 9, wherein
    the accuracy improvement unit is integrated with or embedded in a processor which connects to the 3-axis accelerometer.

* * * * *